(12) United States Patent
Salunkhe et al.

(10) Patent No.: US 11,098,922 B2
(45) Date of Patent: Aug. 24, 2021

(54) ADJUSTABLE MOTOR MOUNT FOR HVAC SYSTEM

(71) Applicant: Johnson Controls Technology Company, Auburn Hills, MI (US)

(72) Inventors: Ravindra B. Salunkhe, Satara (IN); Bhushan C. Kadu, Pune (IN); Makrand N. Yarolkar, Sanquelim (IN); Shridhar V. Vernekar, Sirsi (IN); Vishal S. Jagtap, Dombivli (IN); Pankaj B. Avhad, Nashik (IN)

(73) Assignee: Johnson Controls Technology Company, Auburn Hills, MI (US)

(*) Notice: Subject to any disclaimer, the term of this patent is extended or adjusted under 35 U.S.C. 154(b) by 0 days.

(21) Appl. No.: 16/590,080

(22) Filed: Oct. 1, 2019

(65) Prior Publication Data

US 2021/0071905 A1    Mar. 11, 2021

Related U.S. Application Data

(60) Provisional application No. 62/898,451, filed on Sep. 10, 2019.

(51) Int. Cl.
| | |
|---|---|
| *F16M 1/00* | (2006.01) |
| *F24F 13/32* | (2006.01) |
| *F16M 1/04* | (2006.01) |

(52) U.S. Cl.
CPC ............. *F24F 13/32* (2013.01); *F16M 1/04* (2013.01)

(58) Field of Classification Search
CPC ...... F24F 1/0323; F02K 5/00; B60H 1/00521; F04D 29/668
See application file for complete search history.

(56) References Cited

U.S. PATENT DOCUMENTS

| | | | | |
|---|---|---|---|---|
| 3,093,189 | A | * | 6/1963 | Panthofer ................. F01P 5/02 165/69 |
| 4,155,528 | A | * | 5/1979 | Dawson ............ B60H 1/00521 248/230.9 |
| 4,155,529 | A | * | 5/1979 | Maudlin ............ B60H 1/00521 248/604 |
| 4,191,245 | A | * | 3/1980 | Wendt ...................... H02K 5/00 165/69 |
| 5,069,415 | A | * | 12/1991 | Mechalas ................. H02K 5/26 248/674 |
| 5,492,456 | A | * | 2/1996 | Knight .................. F04D 29/626 248/604 |
| 6,074,182 | A | * | 6/2000 | Matson ................... F04D 25/08 417/423.14 |
| 9,357,699 | B2 | | 6/2016 | Elonsson |
| 9,945,390 | B2 | * | 4/2018 | Cocks ................... F04D 29/667 |

FOREIGN PATENT DOCUMENTS

| | | |
|---|---|---|
| CN | 203537106 U | 4/2014 |
| CN | 204294941 U | 11/2014 |
| CN | 208337325 U | 1/2019 |

* cited by examiner

*Primary Examiner* — Amy J. Sterling
(74) *Attorney, Agent, or Firm* — Fletcher Yoder, P.C.

(57) ABSTRACT

An adjustable mounting assembly for a fan motor includes a frame defining a space configured to receive the fan motor and a plurality of mounting legs configured to mount the frame to a heating, ventilation, and/or air conditioning (HVAC) unit. A length of each mounting leg of the plurality of mounting legs is adjustable.

25 Claims, 9 Drawing Sheets

_US 11,098,922 B2_

ADJUSTABLE MOTOR MOUNT FOR HVAC SYSTEM

CROSS REFERENCE TO RELATED APPLICATIONS

This application claims priority from and the benefit of U.S. Provisional Application Ser. No. 62/898,451, entitled "ADJUSTABLE MOTOR MOUNT FOR HVAC SYSTEM," filed Sep. 10, 2019, which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be noted that these statements are to be read in this light, and not as admissions of prior art.

HVAC systems are utilized in residential, commercial, and industrial environments to control environmental properties, such as temperature and humidity, for occupants of the respective environments. An HVAC system may control the environmental properties through control of an air flow delivered to the environment. For example, the HVAC system may circulate a refrigerant and place the refrigerant in a heat exchange relationship with a supply air flow to condition the supply air flow for delivery to the environment. The HVAC system may also place the refrigerant in a heat exchange relationship with an ambient air flow in order to facilitate cooling of the refrigerant. To this end, the HVAC system may include one or more fans configured to direct the ambient air flow and over a coil through which the refrigerant is directed. Each fan may be operated by a fan motor, and each fan motor may be securely coupled within the HVAC system via a respective motor mount. In some embodiments, each motor mount may be configured to couple to mounting points or locations of the HVAC system that are arranged in a particular orientation. As such, different embodiments of the motor mount may be manufactured to couple to mounting points arranged in different orientations, thereby increasing a cost associated with installation of fan motors in the HVAC system.

SUMMARY

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an adjustable mounting assembly for a fan motor includes a frame defining a space configured to receive the fan motor and a plurality of mounting legs configured to mount the frame to a heating, ventilation, and/or air conditioning (HVAC) unit. A length of each mounting leg of the plurality of mounting legs is adjustable.

In one embodiment, an adjustable mounting assembly for a fan motor includes a frame defining a space configured to receive the fan motor and a plurality of mounting legs configured to mount the frame to a heating, ventilation, and/or air conditioning (HVAC) unit. A length of each mounting leg of the plurality of mounting legs is adjustable.

In one embodiment, an adjustable mounting assembly for a fan motor includes a frame having a plurality of supports defining a space configured to receive the fan motor, a first leg portion configured to extend from a support of the plurality of supports, an adjustment sleeve configured to threadably engage with the first leg portion, and a second leg portion configured to threadably engage with the adjustment sleeve. The second leg portion is configured to couple to a heating, ventilation, and/or air conditioning (HVAC) unit.

DRAWINGS

Various aspects of this disclosure may be better understood upon reading the following detailed description and upon reference to the drawings in which.

DETAILED DESCRIPTION

Figure 1:
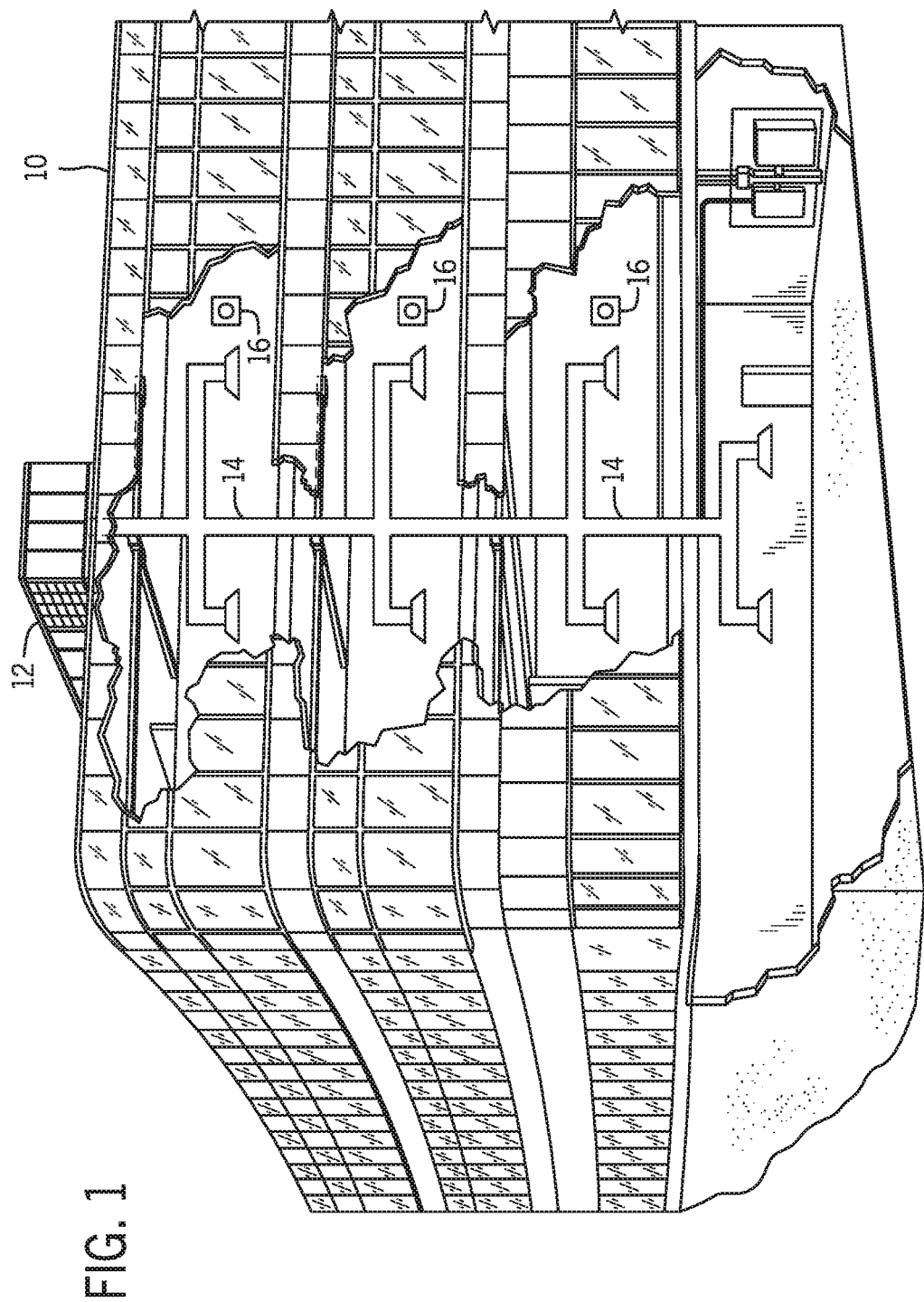
FIG. 1 is a perspective view of an embodiment of a heating, ventilation, and/or air conditioning (HVAC) system for environmental management that may employ one or more HVAC units, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features.

The present disclosure is directed to a heating, ventilation, and/or air conditioning (HVAC) system that includes a fan. In some embodiments, the fan may draw or force air across a heat exchanger of the HVAC system, such as to cool a refrigerant flowing through the heat exchanger or an air flow directed across the heat exchanger. The fan may be driven by a fan motor coupled to the HVAC system. The fan motor may be coupled to the HVAC system via a motor mount that receives and secures the fan motor therein so as to secure the fan motor and fan to the HVAC system. For example, the motor mount may be secured to mounting points of a fan deck or housing of the HVAC system, such as mounting points arranged circumferentially about a fan orifice through which the fan forces the air flow.

Different HVAC system may have respective sets of mounting points positioned at various orientations. For example, different HVAC systems may use differently sized fans and may have differently sized fan orifices. As a result, the respective sets of the mounting points may be positioned differently to accommodate the differently sized fan orifices. However, traditional motor mounts may be configured to align with mounting points arranged in a particular orientation and not to mounting points arranged in a different orientation. Thus, different embodiments of motor mounts may be manufactured, and each motor mount embodiment may align with a specific orientation of mounting points. As a result, a specific motor mount embodiment may be installed in a particular HVAC system. However, manufacturing various embodiments of motor mounts may increase a cost associated with installing fan motors to an HVAC system. For example, if mounting points of a particular HVAC system are to be changed in orientation, such as to support a differently sized fan, additional or different motor mounts may be manufactured to accommodate the change in orientation of the mounting points.

Thus, it is now recognized that implementing a motor mount that is configured to align with mounting points of various orientations may reduce costs associated with manufacture of HVAC systems. In other words, a single motor mount embodiment may be adjustable to align with different sets of mounting points arranged in various orientations. As a result, the single embodiment of the motor mount may be implemented into different HVAC systems. Accordingly, embodiments of the present disclosure are directed to a motor mount that includes legs that are adjustable to align with mounting points arranged in different orientations on the HVAC system. In this manner, a single motor mount embodiment may be manufactured to couple to HVAC systems having mounting points arranged in different orientations. Furthermore, the motor mount embodiment disclosed herein may be configured to adjust a distance between a fan motor received by the motor mount and a structural support to which the motor mount is coupled. For example, the motor mount may accommodate a length or height of the fan motor. Thus, the single motor mount embodiment may be adjustable to couple different fan motors to the structural support. Thus, costs associated with manufacturing and maintaining HVAC systems may be reduced.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
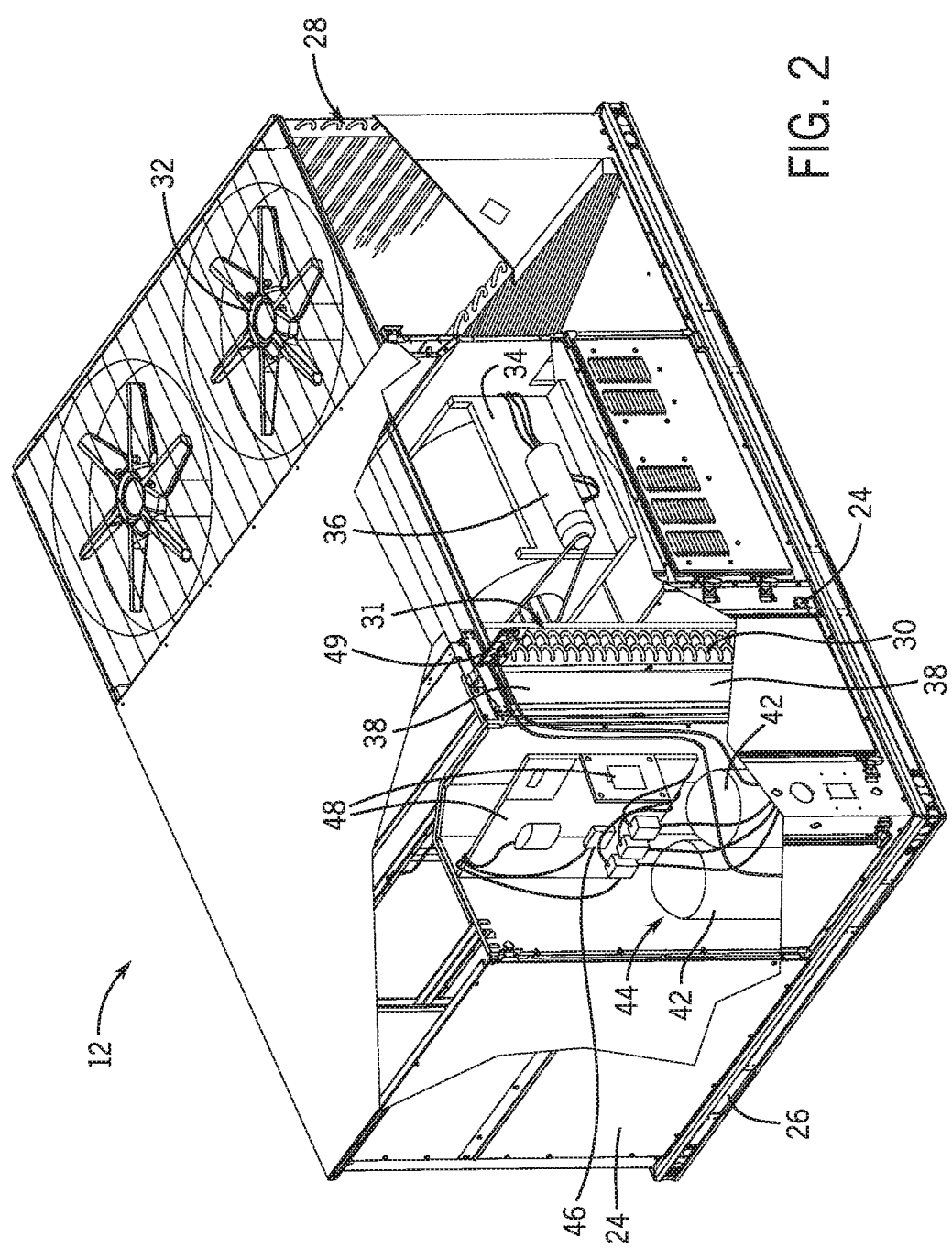
FIG. 2 is a perspective view of an embodiment of a packaged HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be noted, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
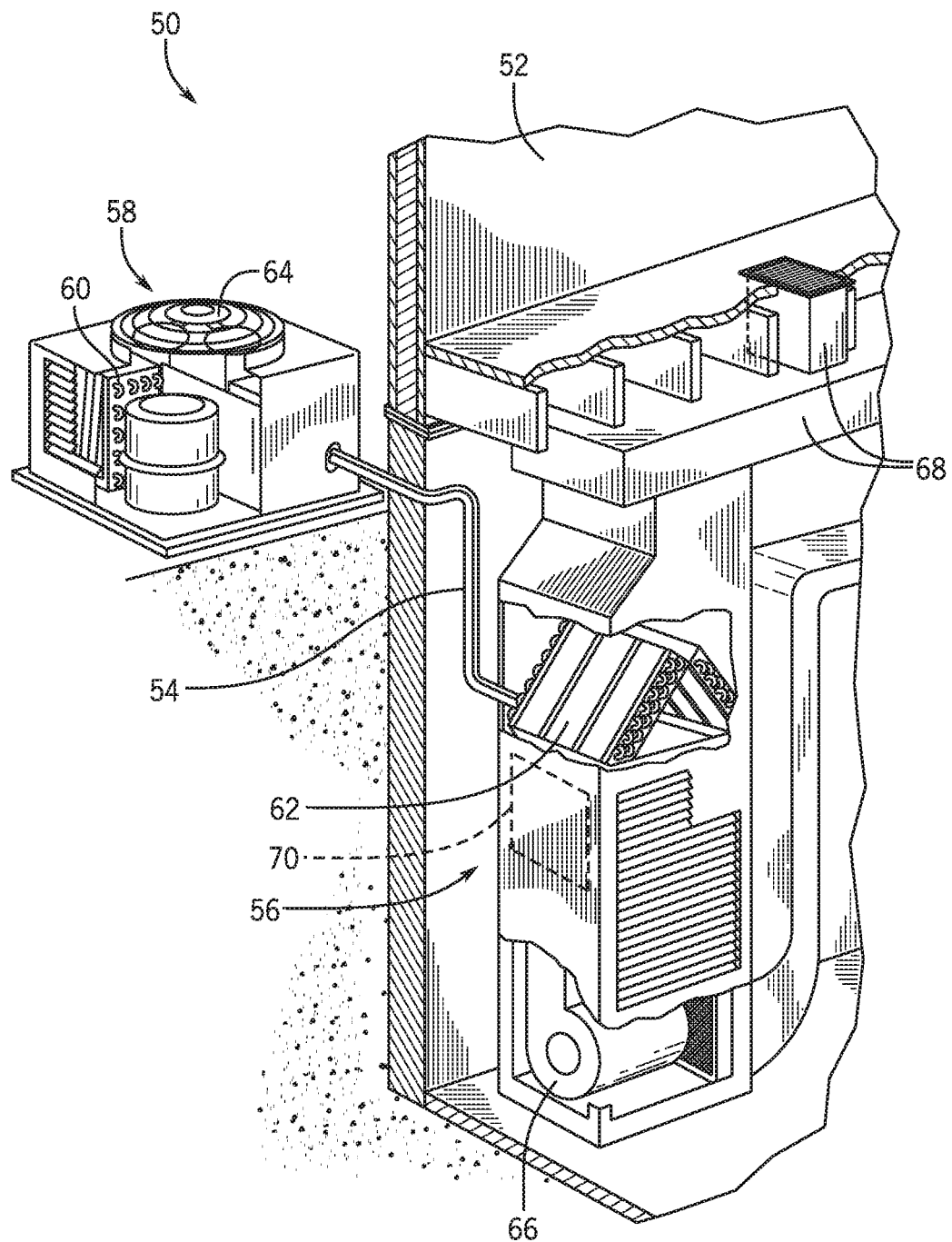
FIG. 3 is a cutaway perspective view of an embodiment of a residential, split HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
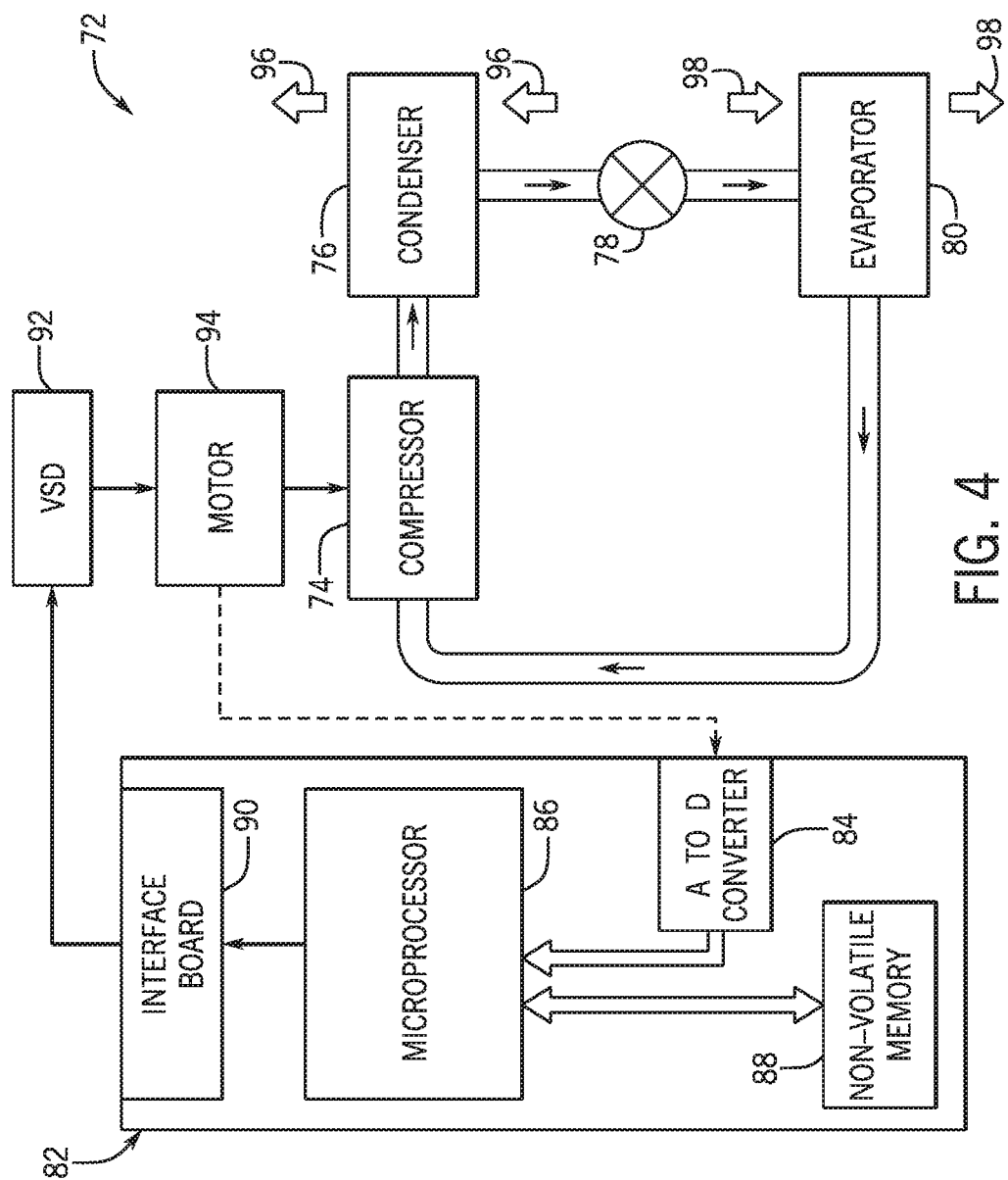
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be noted that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

An HVAC system, such as the HVAC unit 12 and/or the residential heating and cooling system 50, may include a fan configured to draw or force air across a component of the HVAC system, such as a heat exchanger of the HVAC system. For example, the fan may be utilized to cool a refrigerant and/or an air flow of the HVAC system. The fan may be driven by a motor that is supported by a motor mount configured to secure the motor and fan to the HVAC system. The motor mount may be configured to couple to a set of mounting points of the HVAC system, such as mounting points of a housing of the HVAC system. For example, the motor mount may include a frame configured to receive the motor. The motor mount may also include legs that are configured to couple to the respective mounting points of the HVAC system. Each leg may extend and retract relative to the frame to align with a corresponding mounting point at a particular position. Thus, the motor mount is adjustable to accommodate mounting points arranged in various orientations.

Figure 5:
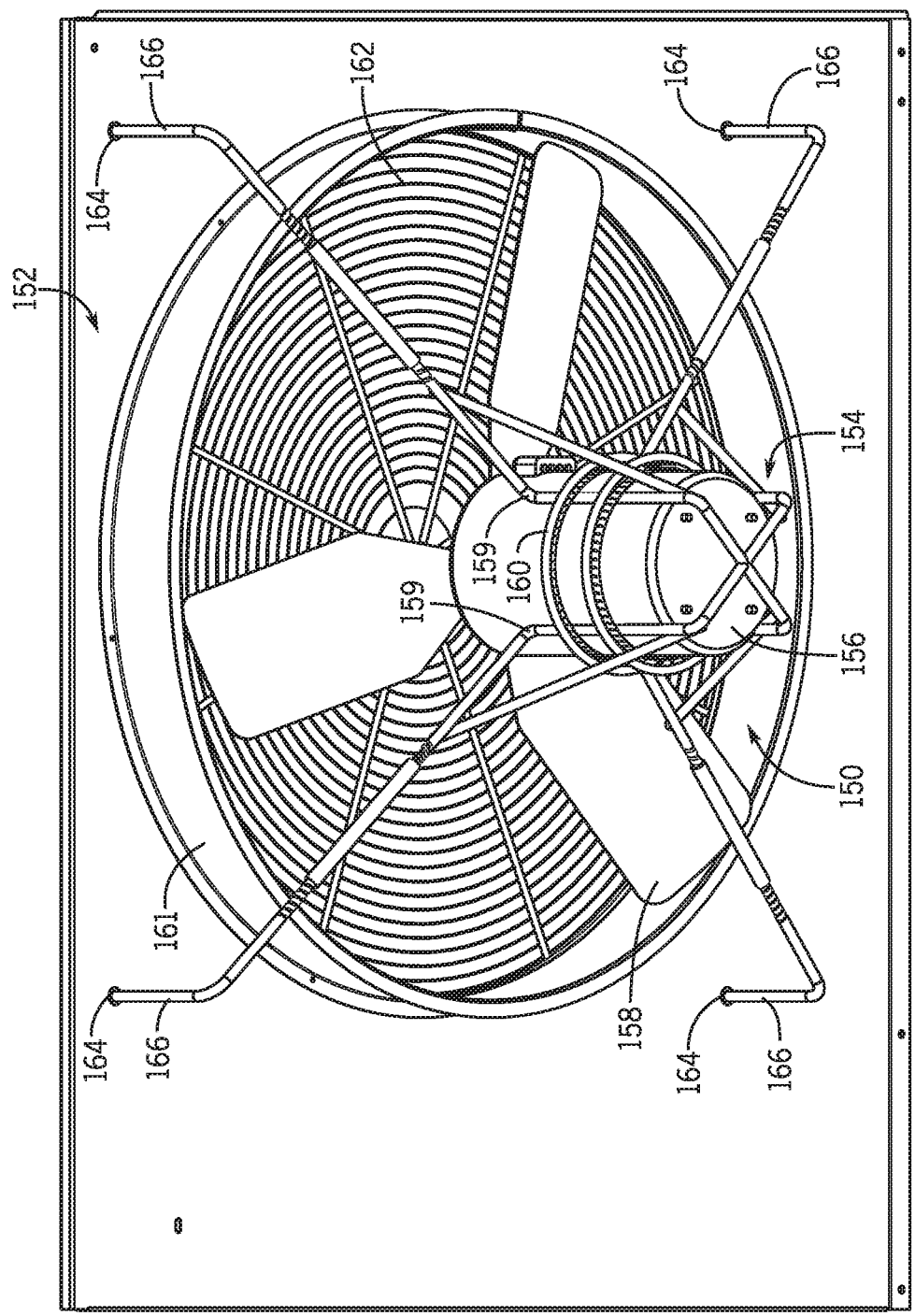
FIG. 5 is a perspective view of an embodiment of an adjustable mounting assembly coupled to a structural support of an HVAC system, in accordance with an aspect of the present disclosure.

FIG. 5 is an embodiment of an adjustable motor mount or mounting assembly 150 coupled to a structural support 152 of an HVAC system, such as of the HVAC unit 12 and/or of the residential heating and cooling system 50. Thus, the mounting assembly 150 is shown in an installed configuration. As an example, the structural support 152 may be a fan deck of the heat exchanger 28 and/or of the outdoor HVAC unit 58. The mounting assembly 150 may include a frame 154 defining a space configured to receive a fan motor 156, which may be coupled to a fan 158. In the illustrated embodiment, the frame 154 includes supports 159 that are configured to abut the fan motor 156 positioned within the frame 154. Thus, the supports 159 may capture the fan motor 156 to secure the fan motor 156 within the frame 154, thereby restricting movement of the fan motor 156 relative to the mounting assembly 150. Additionally or alternatively, the frame 154 may include an enclosure 160 configured to secure the fan motor 156 within the frame 154. The enclosure 160 may surround the fan motor 156 to capture a circumference or a perimeter of the fan motor 156 and restrict movement of the fan motor 156 relative to the mounting assembly 150. For instance, the enclosure 160 may be a clamp configured to adjust and tighten against the fan motor 156 and the frame 154 to secure the fan motor 156 within the frame 154. In further embodiments, additional components may be used to secure the fan motor 156 within the frame 154 and restrict movement of the fan motor 156 relative to the mounting assembly 150. As an example, fasteners, adhesives, another suitable component, or any combination thereof, may be used to couple the fan motor 156 to the frame 154 to secure the fan motor 156 to the mounting assembly 150.

During operation of the HVAC system, the fan motor 156 may be configured to rotate the fan 158 to draw or force air across a coil through which refrigerant flows, thereby cooling the refrigerant. The structural support 152 may have an fan orifice 161 in which the fan 158 may be positioned, and a shroud 162 may be coupled to the structural support 152 over the fan orifice 161 to cover and shield the fan 158 from debris. Thus, the mounting assembly 150 may be configured to position the fan motor 156 and the fan 158 adjacent to the fan orifice 161. By way of example, the structural support 152 may include a set of mounting points 164 positioned in a particular orientation on the structural support 152 about the fan orifice 161. The mounting assembly 150 may include a plurality of mounting legs 166 extending from the frame 154, such as from each support 159, of the mounting assembly 150. Each mounting leg 166 may be configured to couple with one of the mounting points 164. As an example, each mounting point 164 may include an opening through which one of the mounting legs 166 may be inserted. Additionally or alternatively, each mounting point 164 may include another feature to which the mounting leg 166 may be coupled. Coupling all of the mounting legs 166 to the mounting points 164 of the structural support 152 may secure the mounting assembly 150 to the structural support 152, thereby installing the fan motor 156 and the fan 158 supported by the mounting assembly 150 with the structural support 152. Although there are four mounting points 164 and four corresponding mounting legs 166 in the illustrated embodiment, alternative embodiments may include any suitable number of mounting points 164 and corresponding mounting legs 166.

In some embodiments, different structural supports 152 may have mounting points 164 positioned at different locations or in different orientations. As an example, different HVAC systems may have differently-sized fan orifices 161, such as fan orifices 161 having a differently-sized circumference, and the mounting points 164 may be placed at different positions about the fan orifices 161 so to accommodate the difference in circumference of the fan orifices 161. For this reason, the mounting legs 166 may be adjustable so that the mounting assembly 150 may be used with different HVAC systems. By way of example, a length of each mounting leg 166 may be adjusted to align the mounting legs 166 with mounting points 164 at different positions. In this manner, the mounting assembly 150 may be adjustable to mount to different structural supports 152 that may have differently oriented mounting points 164.

Figure 6:
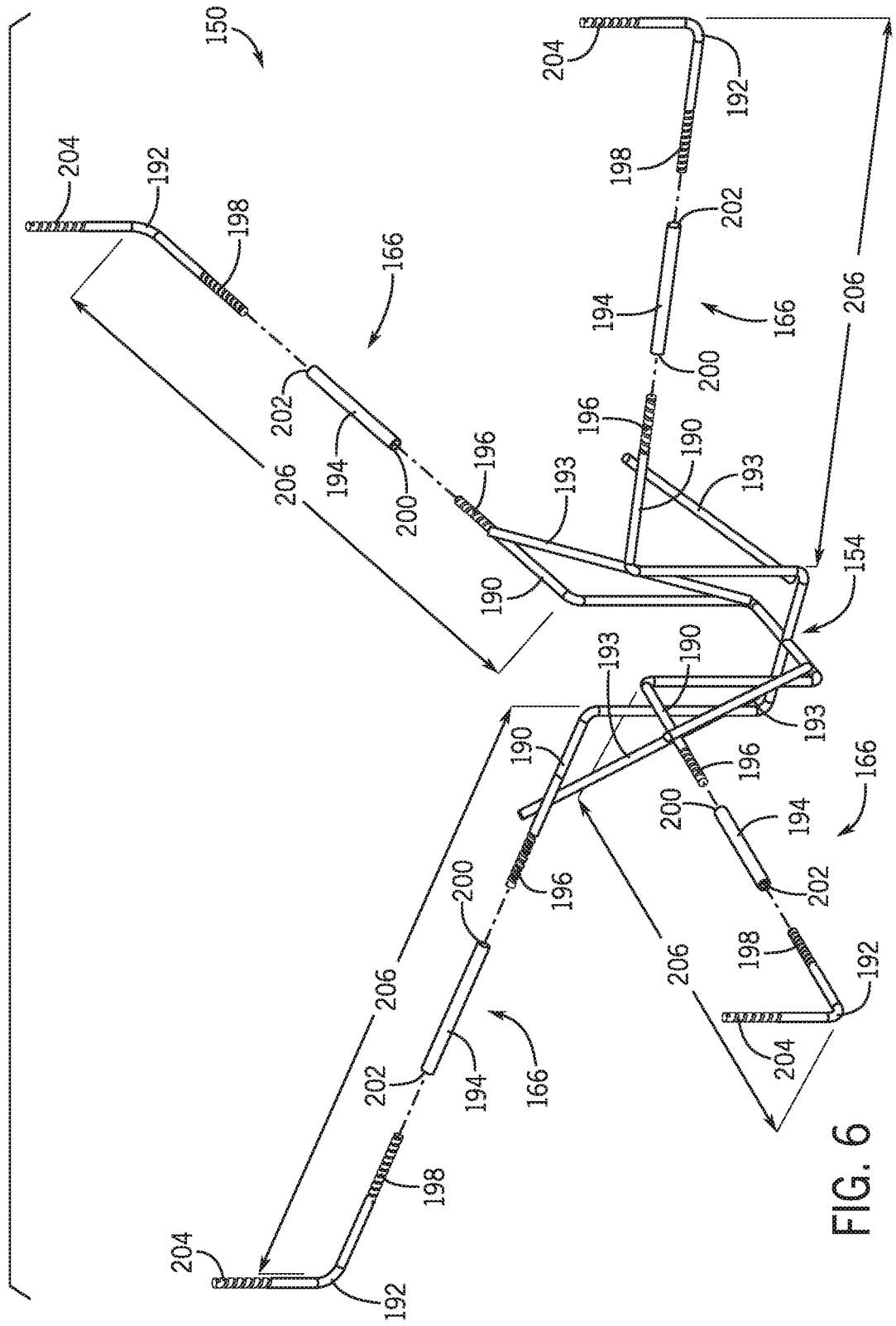
FIG. 6 is an exploded perspective view of an embodiment of a mounting assembly, in accordance with an aspect of the present disclosure.

FIG. 6 is an exploded perspective view of an embodiment of the mounting assembly 150. As shown in FIG. 6, each mounting leg 166 includes a respective first portion 190 and second portion 192. In some embodiments, the first portion 190 may be integrally formed with the frame 154, such as molded or welded onto a corresponding support 159 of the frame 154. In certain implementations, the frame 154 may include a brace 193 configured to extend from the frame 154 to the first portion 190. The brace 193 may restrict movement, such as bending, of the first portion 190 relative to the frame 154, thereby providing structural rigidity for the mounting assembly 150. For instance, the brace 193 may enable the frame 154 to support a weight of the fan motor 156 and the fan 158 in the installed configuration of the mounting assembly 150. The second portion 192 may be a separate component from the frame 154 and may be configured to couple to the first portion 190 via a respective adjustment sleeve 194. As an example, each of the portions 190, 192 may be a threaded rod. Each first portion 190 may include a first threaded end 196, and each second portion 192 may include a second threaded end 198. The adjustment sleeve 194 may include internal threads to which the first threaded end 196 and the second threaded end 198 may threadably engage. For example, each first portion 190 may be configured to be inserted into a first end 200 of the adjustment sleeve 194, and each second portion 192 may be configured to be inserted into a second end 202 of the adjustment sleeve 194 opposite the first end 200.

Furthermore, each second portion 192 may be configured to couple to a respective mounting point 164 of the structural support 152. For instance, the second portion 192 may also include a distal end 204 configured to be inserted into a corresponding mounting point 164. As further described herein, in some embodiments, a position of the second portion 192 relative to the mounting point 164 may be adjustable by changing an amount that the distal end 204 is inserted into the mounting point 164. As a result, a position of the frame 154 and of the fan motor 156 relative to the fan orifice 161 may be adjustable. In this way, the mounting assembly 150 is adjustable to accommodate fan motors 156 of varying sizes or heights.

The adjustment sleeve 194 may be used to adjust a length 206 of the mounting leg 166. By way of example, an amount by which the first threaded end 196 of the first portion 190 is inserted into the first end 200 of the adjustment sleeve 194 and an amount by which the second threaded end 198 of the second portion 192 is inserted into the second end 202 of the adjustment sleeve 194 may be changed to adjust the length 206 of the mounting leg 166. Translating the first threaded end 196 and/or the second threaded end 198 out of the adjustment sleeve 194 moves the second portion 192 away from the first portion 190, thereby moving the distal end 204 away from the frame 154 and increasing the length 206. Translating the first threaded end 196 and/or the second threaded end 198 into the adjustment sleeve 194 moves the second portion 192 toward the first portion 190, thereby moving the distal end 204 toward the frame 154 and decreasing the length 206. Thus, the adjustment sleeve 194 may be used to position the distal end 204 at a particular position or distance away from the frame 154 to align with a corresponding mounting point 164 of the structural support 152.

Figure 7:
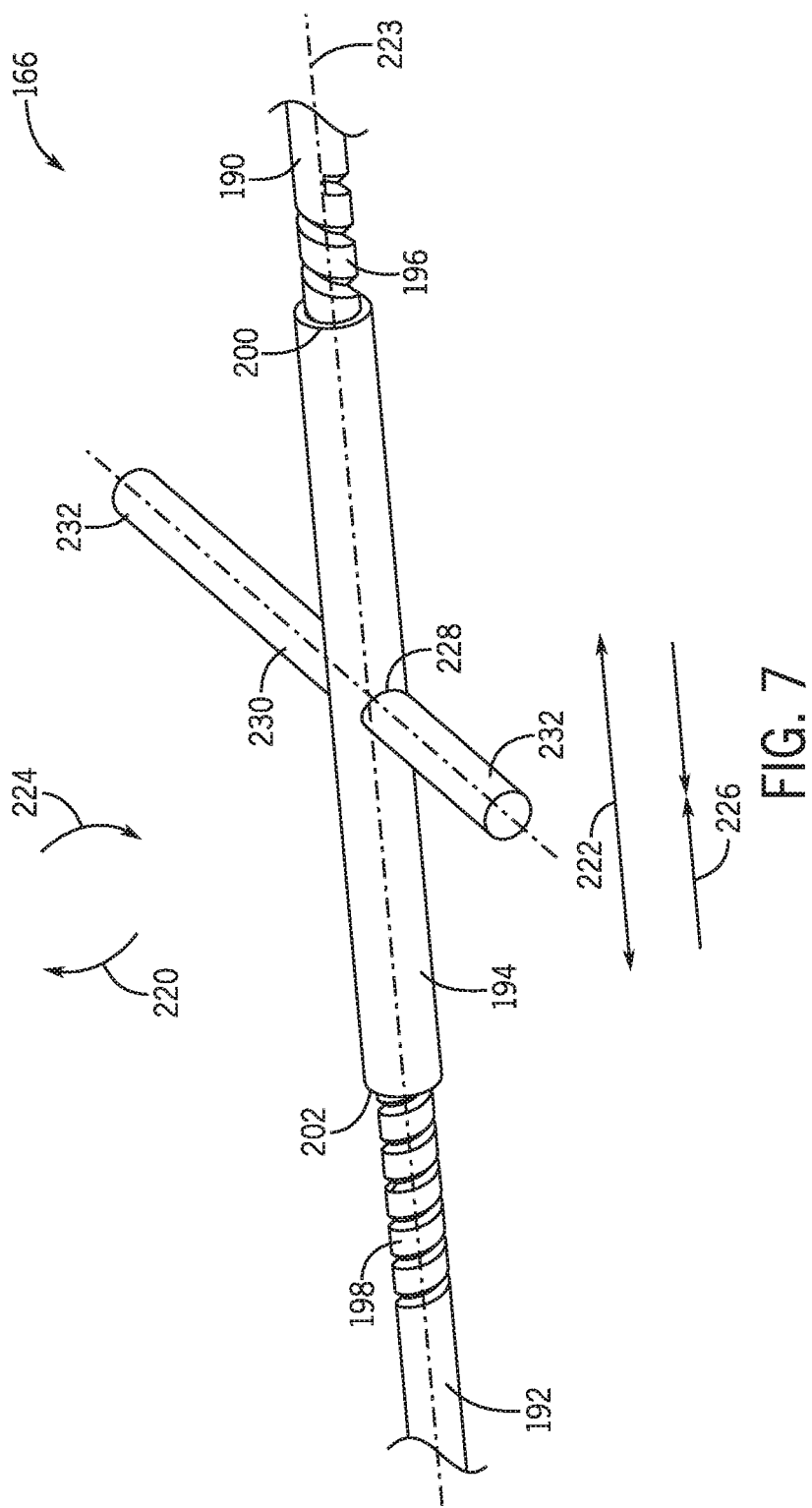
FIG. 7 is an expanded perspective view of an embodiment of a mounting leg of a mounting assembly, in accordance with an aspect of the present disclosure.

FIG. 7 is an expanded perspective view of an embodiment of one of the mounting legs 166 of the mounting assembly 150. As illustrated in FIG. 7, the first threaded end 196 of the first portion 190 is inserted into the first end 200 of the adjustment sleeve 194. In addition, the second threaded end 198 of the second portion 192 is inserted into the second end 202 of the adjustment sleeve 194. Thus, the first portion 190 and the second portion 192 may be coupled together via the adjustment sleeve 194 to form the mounting leg 166 of the mounting assembly 150. Moreover, as mentioned above, the adjustment sleeve 194 may be used to adjust a position of the distal end 204 relative to the frame 154 in order to align the distal end 204 with a corresponding mounting point 164. By way of example, rotation of the adjustment sleeve 194 may change an amount that the first threaded end 196 and/or the second threaded end 198 is inserted into the adjustment sleeve 194. In some embodiments, rotation of the adjustment sleeve 194 in a first rotational direction 220 may move the first portion 190 and the second portion 192 in first translational directions 222 away from one another along an axis 223 of the adjustment sleeve 194, thereby increasing the length 206 of the mounting leg 166. Moreover, rotation of the adjustment sleeve 194 in a second rotational direction 224 may move the first portion 190 and the second portion 192 in second translational directions 226 toward one another along the axis 223, thereby reducing the length 206 of the mounting leg 166.

To this end, the direction of threads of the first threaded end 196 may be opposite the direction of threads of the second threaded end 198. For instance, the first threaded end 196 and the first end 200 of the adjustment sleeve 194 may have right handed threads, and the second threaded end 198 and the second end 202 of the adjustment sleeve 194 may have left handed threads, or vice versa. In this manner, the rotation of the adjustment sleeve 194 in the first rotational direction 220 simultaneously causes the first end 200 and the second end 202 of the adjustment sleeve 194 to move the first threaded end 196 and the second threaded end 198, respectively, out of the adjustment sleeve 194, thereby driving the distal end 204 away from the frame 154. Further, the rotation of the adjustment sleeve 194 in the second rotational direction 224 simultaneously causes the first end 200 and the second end 202 of the adjustment sleeve 194 to move the first threaded end 196 and the second threaded end 198, respectively, into the adjustment sleeve 194, thereby driving the distal end 204 toward the frame 154. Such functionality of the adjustment sleeve 194 facilitates changing the position of the distal ends 204 to align with the mounting points 164 without having to adjust additional components of the mounting assembly 150.

In certain embodiments, the adjustment sleeve 194 may include a hole or receptacle 228 through which a pin 230 may be inserted. The pin 230 may facilitate manual rotation of the adjustment sleeve 194. For instance, a user, such as an operator of the HVAC system, may insert the pin 230 through the hole 228 and may use ends 232 of the inserted pin 230 as leverage for providing enough torque to rotate the pin 230 in the first rotational direction 220 or the second rotational direction 224. After the adjustment sleeve 194 has been rotated to place the distal end 204 at a desirable position, the pin 230 may be removed from the hole 228 so that the pin 230 is not inadvertently used to cause undesirable adjustment of the lengths 206 of the mounting legs 166. In additional or alternative embodiments, the pin 230 may be configured to remain within the hole 228. To avoid inadvertent rotation of the adjustment sleeve 194 via the pin 230, the ends 232 may be adjustable relative to the adjustment sleeve 194. By way of example, the ends 232 of the pin 230 may fold to align with the adjustment sleeve 194, thereby reducing the amount that the ends 232 extend out of the opening 228.

Figure 8:
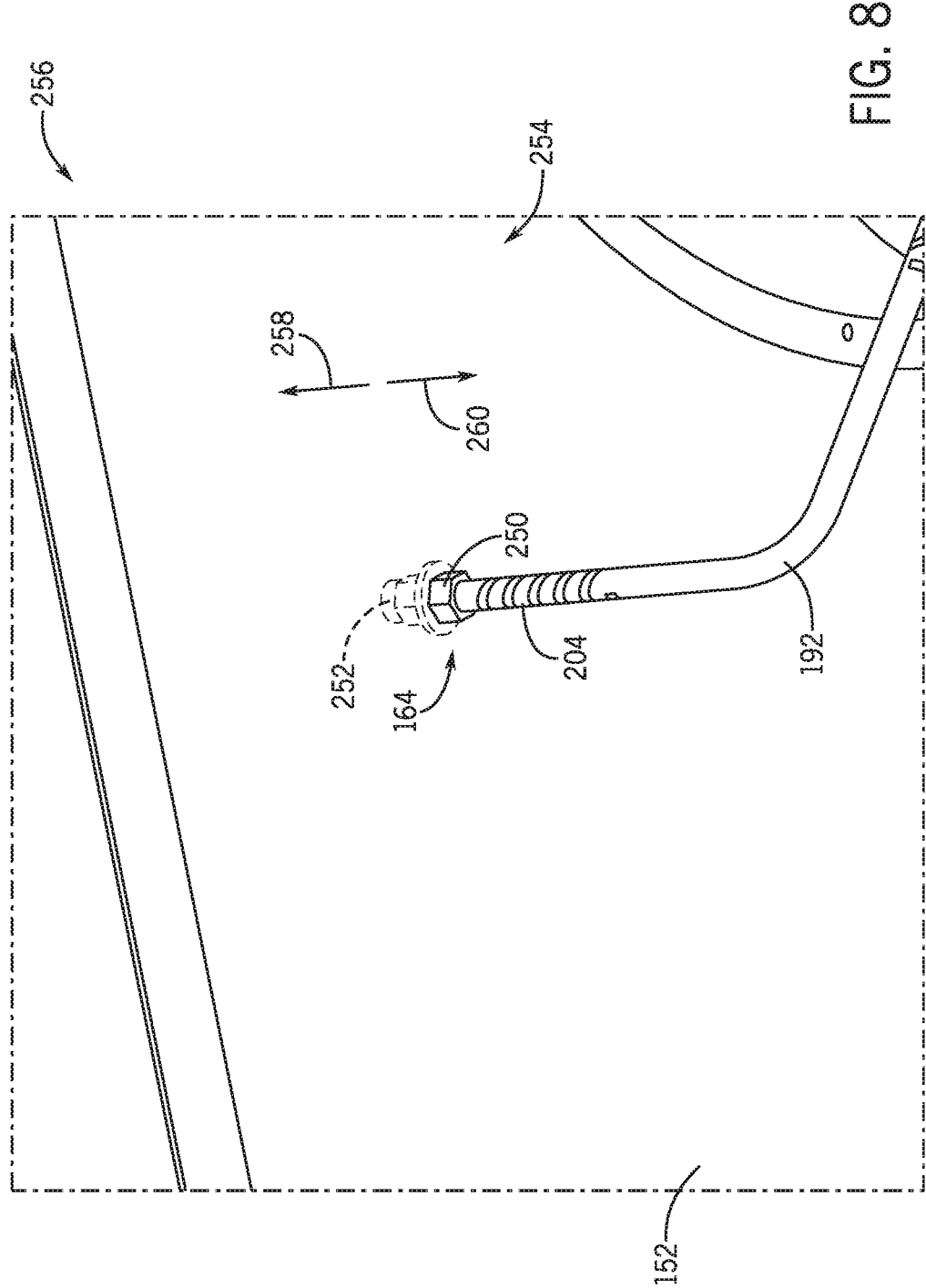
FIG. 8 is an expanded perspective view of an embodiment of a portion of a mounting assembly coupled to a mounting point of a structural support, in accordance with an aspect of the present disclosure.

FIG. 8 is an expanded perspective view of an embodiment of the second portion 192 coupled to one of the mounting points 164 of the structural support 152. The distal end 204 may be inserted through the mounting point 164 to couple the second portion 192 to the structural support 152. The distal end 204 may also be threaded, and a first nut 250 and a second nut 252 may be threadably coupled to the distal end 204 to secure the distal end 204 within the mounting point 164. For example, the first nut 250 may be coupled to the distal end 204 at a first side 254 of the structural support 152, and the second nut 252 may be coupled to the distal end 204 at a second side 256 opposite the first side 254 of the structural support 152. To secure the position of the distal end 204 within the mounting point 164, the first nut 250 and the second nut 252 may be tightened to abut the first side 254 and the second side 256, respectively, thereby imparting a compressive force against the structural support 152. That is, abutment of the first nut 250 against the first side 254 of the structural support 152 may block movement of the distal end 204 in a first vertical direction 258, and abutment of the second nut 252 against the second side 256 of the structural support 152 may block movement of the distal end 204 in a second vertical direction 260. Thus, abutment of the first nut 250 against the first side 254 and abutment of the second nut 252 against the second side 256 block movement of the distal end 204 in both the first and second vertical directions 258, 260, thereby restricting movement of the distal end 204 relative to the mounting point 164.

To adjust the position of the distal end 204 within the mounting point 164, one or both of the nuts 250, 252 may be moved. For example, movement of the first nut 250 away from the first side 254 may enable the distal end 204 to move in the first vertical direction 258, thereby moving the frame 154 toward the structural support 152 to reduce the height of the frame 154 relative to the structural support 152. Additionally, movement of the second nut 252 away from the second side 256 may enable the distal end 204 to move in the second vertical direction 260, thereby moving the frame 154 away from the structural support 152 to increase the height of the frame 152 relative to the structural support 152. Once the distal end 204 is moved to a desirable position within the mounting point 164, the nuts 250, 252 may be moved to abut the first and second sides 254, 256 of the structural support 152, thereby maintaining the position of the distal end 204 in the mounting point 164.

Figure 9:
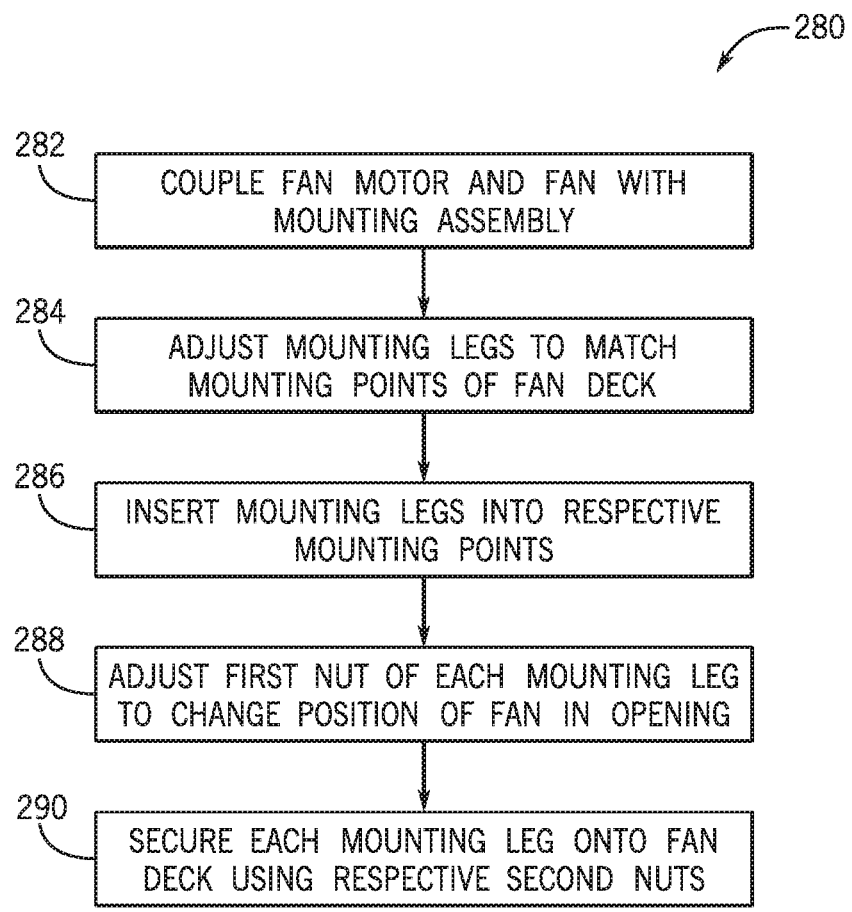
FIG. 9 is a flow chart for an embodiment of a method for coupling a fan motor and a fan to a structural support using a mounting assembly, in accordance with an aspect of the present disclosure.

FIG. 9 is a flowchart of an embodiment of a method or process 280 for coupling the fan motor 156 and the fan 158 to the structural support 152 using the mounting assembly 150. The method 280 may be performed by a user, such as a manufacturer or operator of the HVAC system having the structural support 152. It should be understood that the method 280 may be performed differently than depicted in FIG. 9, such as for different embodiments of the mounting assembly 150. For instance, additional steps may be performed with respect to the depicted method 280, or certain steps of the method 280 may be removed, modified, or performed in a different order.

At block 282, the fan motor 156 and the fan 158 are coupled to the frame 154 of the mounting assembly 150. By way of example, the fan motor 156 may be inserted into the space defined by the frame 154. Thus, the supports 159 of the frame 154 may abut the fan motor 156 to capture the fan motor 156 within the space. Additionally, the enclosure 160 may be implemented to secure the fan motor 156 to the frame 154. As an example, the enclosure 160 may be tightened to enable the supports 159 to impart a compressive force onto the fan motor 156, further holding the fan motor 156 within the space.

At block 284, the mounting legs 166 are adjusted to align the distal ends 204 with the mounting points 164. In particular, the distal ends 204 may be moved relative to the frame 154. For instance, the adjustment sleeves 194 may be rotated to extend the distal ends 204 farther away from the frame 154. Alternatively, the adjustment sleeves 194 may be rotated to retract the distal ends 204 closer to the frame 154. In some embodiments, the pin 230 may be inserted through the receptacle 228 of the adjustment sleeve 194 to facilitate the rotation of the adjustment sleeve 194.

Once the mounting legs 166 have been adjusted to the desirable position to align with the mounting points 164, the mounting assembly 150 may be positioned to insert each of the distal ends 204 through the respective mounting points 164, as indicated at block 286. By way of example, each second portion 192 may include the first nut 250, but not the second nut 252 coupled to the distal end 164. Thus, the distal ends 204 may be inserted until the first nut 250 of each distal end 204 abuts the first side 254 of the structural support 152.

At block 288, the position of the first nuts 250 may be adjusted to change the amount that the distal ends 204 are inserted into the mounting points 164. Adjusting how much the distal ends 204 are inserted into the mounting point 164 may change a position of the fan motor 156 and of the fan 158 relative to the fan orifice 161. The position of each distal end 204 may be adjusted based on a length of the fan motor 156 and of a desirable position of the fan 158 within the fan orifice 161. In an example, the distal ends 204 may be inserted farther into the mounting points 164 to position the fan 158 farther within the fan orifice 161 and closer to the shroud 162, such as for a fan motor 156 having a shorter length or height. In another example, the distal ends 204 may be moved farther out of the mounting points 164 to position the fan 158 farther away from the shroud 162, such as for a fan motor 156 having a longer length or height. In any case, the position of the mounting assembly 150 relative to the structural support 152 is easily adjustable via the first nuts 150 of the distal ends 204. For some embodiments, the number of exposed threads of each respective distal end 204 may be counted and compared to one another to determine whether the mounting assembly 150, and thus the fan 158, are level relative to the structural support 152. For instance, each distal end 204 may have the same number of threads extending out of the corresponding mounting point 164 when the mounting assembly 150 is level.

At block 290, the position of each mounting leg 166 is secured within the mounting points 164 by coupling the second nuts 252 onto the distal ends 204. In particular, the second nuts 252 may be threaded onto the distal ends 204 until each second nut 252 abuts the second side 256 of the structural support 152. As a result, the first and second nuts 250, 252 provide a clamping force that restricts movement of the distal ends 204 within the mounting points 164. Therefore, the mounting assembly 150 is secured to the structural support 152.

It should be noted that a method opposite the method 280 may be performed for decoupling the fan motor 156 and the fan 158 from the mounting assembly 150 and from the structural support 152. In other words, the second nuts 252 may be removed from the distal ends 204 of the mounting legs 166, the distal ends 204 may be removed from the mounting points 164, and the fan motor 156 and the fan 158 may be removed from the space defined by the frame 154 of the mounting assembly 150. Thus, the fan motor 156 and the fan 158 may be easily removed from the structural support 152 and from the HVAC system, such as for maintenance or replacement.

The present disclosure may provide one or more technical effects useful in the manufacture, installation, and/or operation of an HVAC system. For example, the HVAC system may use a fan to provide cooling of a refrigerant or air flow of the HVAC system. The fan may be coupled to a respective fan motor configured to rotate the fan. The fan motor may be secured to the HVAC system, such as to a structural support, via a motor mount. The motor mount may include a frame that defines a space in which the fan motor may be disposed. The motor mount may include mounting legs that are configured to align with mounting points of the structural support. The mounting legs may be adjustable so as to align with mounting points positioned at various locations or in various orientations. Thus, the motor mount of the present disclosure may be configured to couple to different HVAC systems that may have differently-positioned mounting points. Furthermore, the position of the mounting legs within the mounting points may be adjustable so as to change the position of the fan motor relative to the structural support. For example, the motor mount may be moved to position the fan motor closer or farther away from the structural support, so as to accommodate a length of the motor. Thus, the motor mount may enable an HVAC system to use differently-sized motors without having to manufacture different embodiments of motor mounts. In this way, the motor mount may reduce a cost associated with installing different motors in different HVAC systems. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be noted that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be noted that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation and/or air conditioning (HVAC) system, comprising:
   a structural support comprising a plurality of mounting points, wherein each mounting point of the plurality of mounting points comprises an opening;
   a frame configured to receive a fan motor therein; and
   a plurality of mounting legs that each comprise a first portion coupled to the frame and a second portion coupled to the structural support, wherein the first portion and the second portion are adjustable relative to one another, each mounting leg of the plurality of mounting legs is adjustable to align the second portion with a corresponding mounting point of the plurality of mounting points, and the second portion comprises a distal end extending into the opening of the corresponding mounting point.

2. The HVAC system of claim 1, wherein each mounting leg of the plurality of mounting legs includes a sleeve configured to receive the first portion and the second portion.

3. The HVAC system of claim 2, wherein the sleeve is configured to threadably engage with the first portion and the second portion.

4. The HVAC system of claim 3, wherein axial rotation of the sleeve in a first direction relative to the first portion and second portion causes the first portion and the second portion to translate away from each other along an axis of the sleeve, and axial rotation of the sleeve in a second direction, opposite the first direction, relative to the first portion and the second portion causes the first portion and the second portion to translate toward each other along the axis.

5. The HVAC system of claim 4, wherein the first portion includes right handed threads, and the second portion includes left handed threads.

6. The HVAC system of claim 2, wherein the sleeve has a receptacle for a pin configured to provide leverage for rotation of the sleeve.

7. The HVAC system of claim 1, wherein the structural support is a fan deck of the HVAC system.

8. The HVAC system of claim 1, wherein a position of the distal end within the opening of the corresponding mounting point is adjustable via a set of nuts coupled to the distal end.

9. An adjustable mounting assembly for a fan motor, comprising:
   a frame defining a space configured to receive the fan motor; and
   a plurality of mounting legs configured to mount the frame to a heating, ventilation, and/or air conditioning (HVAC) unit, wherein a length of each mounting leg of the plurality of mounting legs is adjustable, and each mounting leg of the plurality of mounting legs comprises a first threaded rod, a second threaded rod, and an adjustment sleeve configured to couple the first threaded rod to the second threaded rod.

10. The adjustable mounting assembly of claim 9, wherein the first threaded rod is integrally formed with the frame, and the second threaded rod is configured to couple to a fan deck of the HVAC unit.

11. The adjustable mounting assembly of claim 9, wherein the adjustment sleeve includes a hole configured to receive a pin that facilitates manual rotation of the adjustment sleeve to adjust the length of the mounting leg.

12. The adjustable mounting assembly of claim 11, wherein rotation of the adjustment sleeve in a first rotational direction increases the length of the mounting leg, and rotation of the adjustment sleeve in a second rotational direction reduces the length of the mounting leg.

13. The adjustable mounting assembly of claim 9, wherein the second threaded rod includes a threaded distal end configured to couple to a fan deck of the HVAC unit via a plurality of nuts, and a distance of the frame from the fan deck is adjustable via adjustment of the plurality of nuts.

14. The adjustable mounting assembly of claim 13, wherein a first nut of the plurality of nuts is configured to couple to the threaded distal end on a first side of the fan deck, and a second nut of the plurality of nuts is configured to couple to the threaded distal end on a second side of the fan deck opposite the first side.

15. The adjustable mounting assembly of claim 9, comprising a clamp configured to secure the fan motor within the space of the frame.

16. The adjustable mounting assembly of claim 15, wherein the clamp is configured to impart a compressive force on a plurality of supports of the frame to secure the fan motor within the space of the frame.

17. An adjustable mounting assembly for a fan motor, comprising:
   a frame having a plurality of supports defining a space configured to receive the fan motor;
   a first leg portion configured to extend from a support of the plurality of supports;
   an adjustment sleeve aligned coaxially with the first leg portion; and
   a second leg portion aligned coaxially with the first leg portion and the adjustment sleeve, wherein the second leg portion is configured to couple to a heating, ventilation, and/or air conditioning (HVAC) unit, and the first leg portion and the second leg portion are adjustable relative to one another.

18. The adjustable mounting assembly of claim 17, wherein the first leg portion is configured to threadably engage with a first end of the adjustment sleeve, the second leg portion is configured to threadably engage with a second end of the adjustment sleeve, the first end includes first internal threads, and the second end includes second internal threads, the first and second internal threads have opposite orientations.

19. The adjustable mounting assembly of claim 18, wherein rotation of the adjustment sleeve in a first rotational direction causes the first leg portion and the second leg portion to transition out of the adjustment sleeve, and rotation of the adjustment sleeve in a second rotational direction causes the first leg portion and the second leg portion to transition into the adjustment sleeve.

20. The adjustable mounting assembly of claim 17, comprising a brace extending from the support to the first leg portion.

21. The adjustable mounting assembly of claim 17, wherein the plurality of supports is configured to abut the fan motor in an installed configuration of the adjustable mounting assembly.

22. The adjustable mounting assembly of claim 17, wherein the second leg portion includes a distal end configured to be inserted into a mounting point of a structural support of the HVAC unit, a position of the distal end within the mounting point is adjustable, the second leg portion includes a first nut configured to couple to the distal end on a first side of the structural support and a second nut configured to couple to the distal end on a second side opposite the first side of the structural support, and the position of the distal end within the mounting point is secured by abutment of the first nut with the first side and abutment of the second nut with the second side.

23. The adjustable mounting assembly of claim 17, wherein each of the first leg portion, the adjustment sleeve, and the second leg portion is translatable relative to one another.

24. The adjustable mounting assembly of claim 17, wherein the first leg portion, the adjustment sleeve, and the second leg portion cooperatively define a length, and each of the first leg portion, the adjustment sleeve, and the second leg portion is adjustable relative to one another to adjust the length.

25. The adjustable mounting assembly of claim 17, wherein the first leg portion is configured to extend into a first end of the adjustment sleeve, and the second leg portion is configured to extend into a second end, opposite the first end, of the adjustment sleeve.

\* \* \* \* \*